2 Sheets, Sheet 1.

L. J. W. S. and C. H. McCormick,
Mower.

No. 973. Reissued June 5. 1860.

2 Sheets. Sheet 2.

L. J. W. S. and C. H. McCormick
Mower.

No. 973

Reissued. June 5. 1860

UNITED STATES PATENT OFFICE.

C. H. McCORMICK, OF CHICAGO, ILLINOIS, ASSIGNEE OF L. J. McCORMICK, W. S. McCORMICK, AND C. H. McCORMICK.

IMPROVEMENT IN REAPING AND MOWING MACHINES.

Specification forming part of Letters Patent No. 20,212, dated May 11, 1858: Reissue No. 973, dated June 5, 1860.

DIVISION No. 2.

*To all whom it may concern:*

Be it known that LEANDER J. McCORMICK, WILLIAM S. McCORMICK, and CYRUS H. McCORMICK, all of Chicago, in the county of Cook and State of Illinois, have invented certain new and useful Improvements in Reaping and Mowing Machines, of which the following is a full, clear, and exact description, reference being had to the accompanying drawings, making part of this specification, in which—

Figure 1:
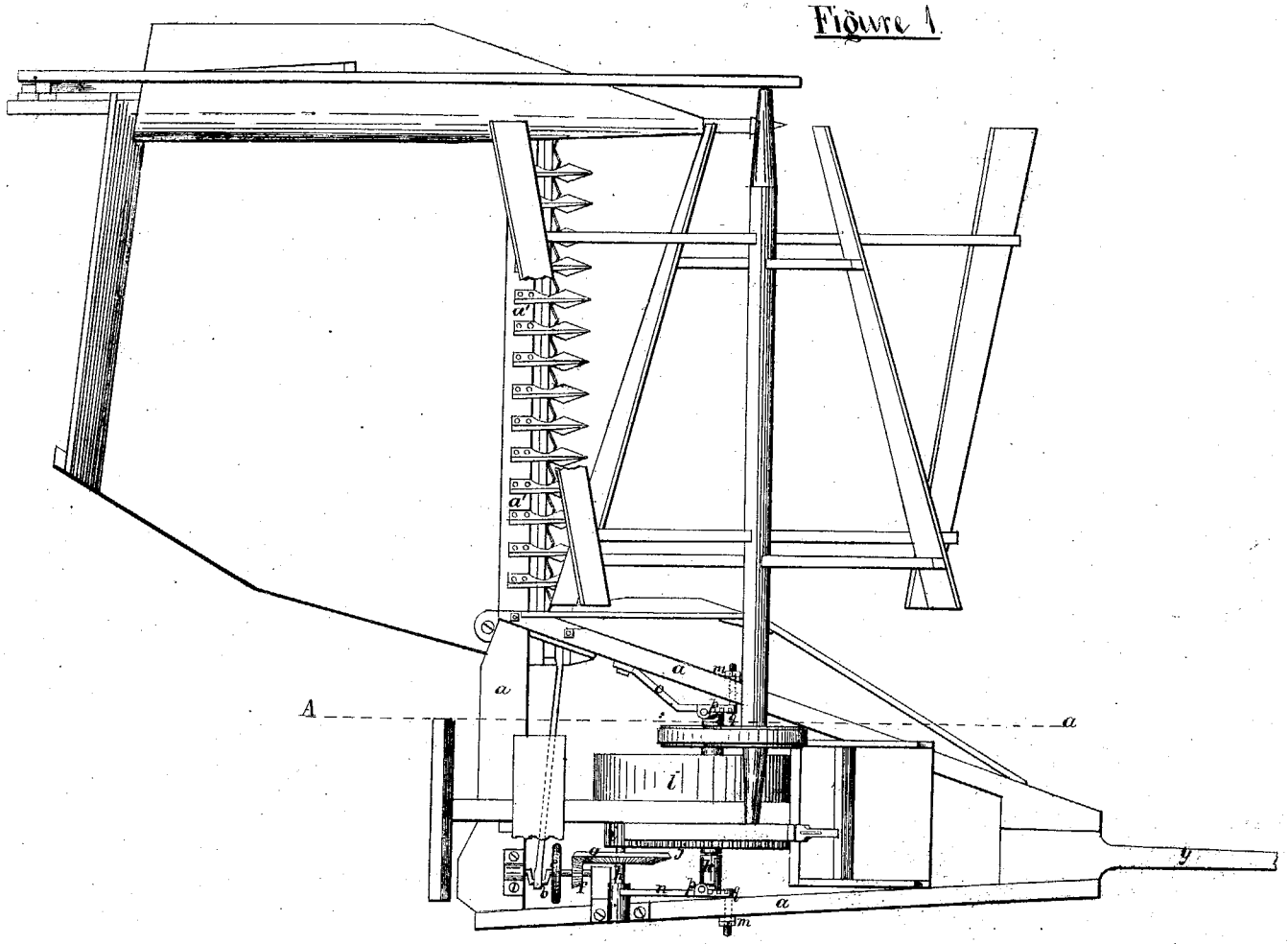
Figure 2:
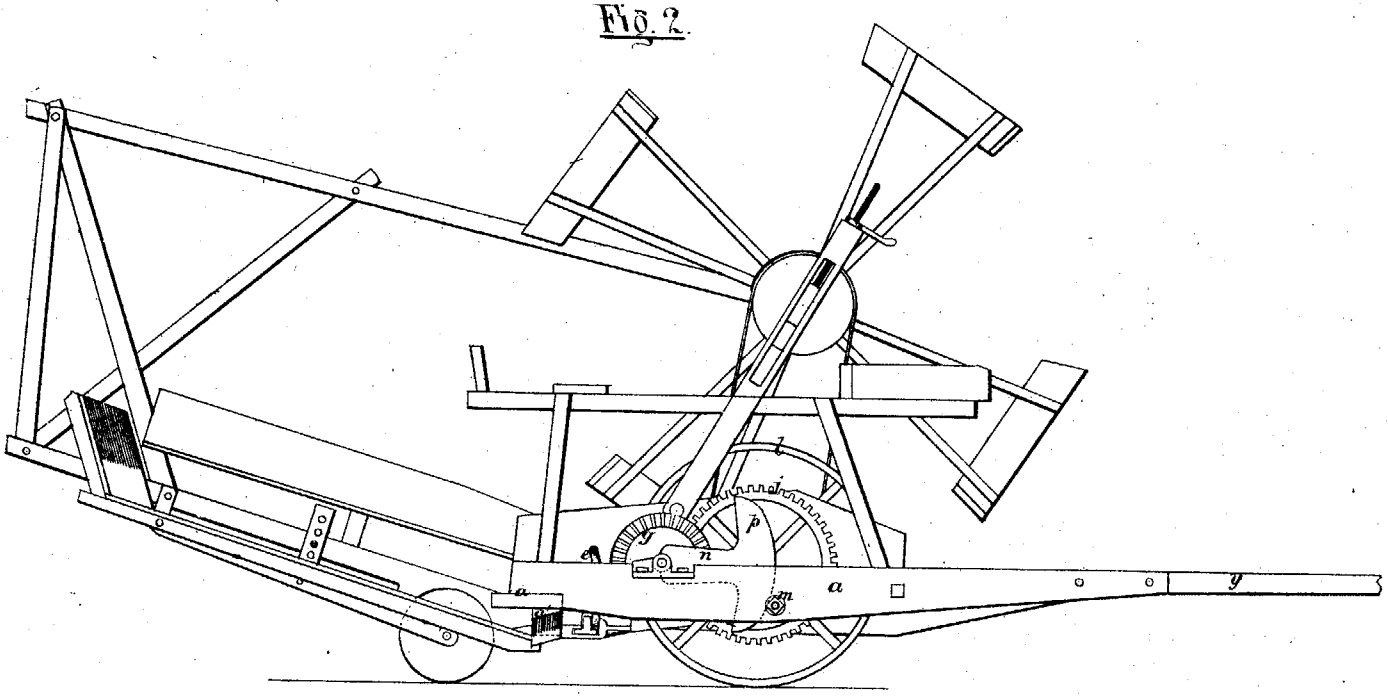
Figure 3:
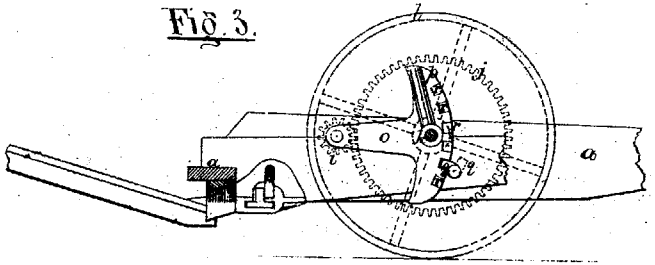

Figure 1 represents a plan of a reaping and mowing machine embracing said improvements, and Fig. 2 a side elevation of the same. Fig. 3 represents a vertical section taken at the line A *a* of Fig. 1.

The improvement which is the subject of this patent consists in the combination of the main frame of the machine, having the cutting apparatus arranged to project from one of its sides, said frame carrying a portion of the gearing and supporting it in the proper relative position, with auxiliary frame-work for supporting the driving-wheel and the remaining portion of the gearing, and a pivotal or equivalent means of connecting the auxiliary and main frames, the whole arranged, substantially as hereinafter more particularly described, to adapt the machine to mowing grass.

The part of the invention for adapting the machine to reaping consists, further, in the combination, with one portion, of the gearing and the main frame having a platform, grain-wheel, divider, and cutting apparatus projecting on one side thereof, with auxiliary frame-work, the other portion of the gearing, the driving-wheel, a pivotal connection for uniting the two portions of the gearing and the two frames, and a toothed sector and detent to provide for shifting the main frame and platform to and holding them at various heights above the ground while the two portions of the gearing remain properly engaged, as hereinafter more particularly described.

The invention, so far as applicable to the machine when adapted for either mowing grass or reaping grain, consists, also, in the combination of the sector with the reversible detent adapted to perform the double duty of detent and guide, in a manner which is hereinafter more fully described.

The machine is so constructed that the finger-beam *a'* and the draft pole or tongue *y* are placed at right angles, or thereabout, with each other and connected by a strong frame, *a a a*, which it is preferred to make of a triangular form. This frame strengthens the connection of the draft-pole and the finger-beam, so as to insure a firm support for the cutting apparatus, especially against the horizontal strains from which it is so liable to injury when the machine is used for mowing. This frame likewise supports that portion of the gearing which is more immediately concerned in giving motion to the crank that vibrates the cutter. The gearing thus supported consists of the crank-shaft *b*, its balance-wheel *e*, and bevel-pinion *f*, the counter-shaft *h*, and the bevel-wheel *g* and master-pinion *i*, both mounted upon the counter-shaft. The remainder of the gearing, consisting of the master-wheel *j*, together with the driving-wheel *l* and the main shaft *k*, which carries both the driving and master wheels, is supported by auxiliary frame-work pivoted to the main frame in the line of the axis of one of the wheels of the gearing. This auxiliary frame-work it is preferred to make in the form of adjustable arms or plates *o n*, and to pivot these plates at one end to the main frame on the line of the axis of the counter-shaft *h*, and to make them carry at their opposite ends boxes or bearings for the main shaft *k* and sectors *p p*, provided with notches *r*, to admit a detent, *q*, to hold the main frame at any height at which it may be set on the sector to carry the cutter at the required height above the ground.

When the cutter is required to run very near to the surface of the ground, the detents *q* may be withdrawn from the notches of the sectors, when the main frame and the auxiliary frame-work will each be free to rise and fall, and in doing so will turn on their pivotal axis of connection. The detents each consist of a hook-headed bolt, the hook being of the proper size and form to enter the notches in the sectors and the shank of the bolt passing through a hole in the side of the main frame, and having a screw-nut, *m*, on its end to clamp it (the sector) and the main frame together, or simply to clamp the bolt itself fast to the frame when its hook is disengaged from the sector and reversed, as shown by the dotted lines in Fig. 3. In the latter case the head of the bolt simply acts as a guide for the periphery of the sector, which is concentric with the pivots on which it vibrates. In Figs. 1 and 3 the detent is shown in black lines with its hook engaged with one of the notches of the sector and the latter clamped fast to the side of the main frame, and in dotted lines with its hook disengaged from the notches of the sector, leaving the latter free to turn and allow the main frame, with the finger-beam and other parts which it carries, freely to rise and fall independently of the driving-wheel, the latter being also free to rise and fall to conform to the surface on which it travels.

To shift the main frame up and down and set it at any required height it is merely necessary to turn back the nut *m*, disengage the detent from the notches of the sector, move the main frame to the point required, and then re-engage the detent with the sector and clamp it firmly by turning up again the nut *m*.

Under the various changes in the position of the main frame and its gearing relative to the auxiliary frame-work and the driving-wheel and gearing connected therewith the two portions of the gearing are equally and constantly engaged.

What is claimed under this patent as the invention of the said LEANDER J., WILLIAM S., and CYRUS H. MCCORMICK is—

1. An improvement adapting the machine to mowing grass, consisting of the segmental pivoted frame, its gearing, and the driving-wheel, in combination with the main frame having the cutting apparatus projecting on one side thereof, and carrying the other portion of the gearing, the whole arranged substantially as and for the purpose specified.

2. An improvement adapting the machine to reaping grain, consisting in the combination of the main frame carrying one portion of the gearing, and having a platform, grain-wheel, divider, and cutting apparatus projecting on one side thereof, with auxiliary frame-work, the other portion of the gearing, the driving-wheel, a pivotal connection for uniting the two portions of the gearing and the two frames, and the toothed hinged sector and detent to provide for shifting the main frame and platform to and holding them at different heights, substantially as described.

3. An improvement applicable to the machine when adapted for either mowing grass or reaping grain, and consisting of the combination of the sector with the reversible detent adapted to performing the double duty of detent and guide, substantially as described.

In testimony whereof I have hereunto subscribed my name.

C. H. MCCORMICK.

Witnesses:
ROBT. VINCENT,
D. C. JOHNSON.